United States Patent [19]

Sagara

[11] 4,084,978

[45] Apr. 18, 1978

[54] GLASS FOR EYE GLASS LENS

[75] Inventor: Hiroji Sagara, Akikawa, Japan

[73] Assignee: Hoya Corporation, Tokyo, Japan

[21] Appl. No.: 749,565

[22] Filed: Dec. 10, 1976

[30] Foreign Application Priority Data

Dec. 10, 1975 Japan .................. 50-147098

[51] Int. Cl.² ................................. C03C 3/08
[52] U.S. Cl. ..................... 106/54; 106/47 Q
[58] Field of Search ................ 106/47 Q, 54

[56] References Cited

U.S. PATENT DOCUMENTS 3,877,953 4/1975 Broemer et al. ............ 106/47 Q
3,898,093 8/1975 Faulstich et al. ............... 106/54

Primary Examiner—Winston A. Douglas
Assistant Examiner—Mark Bell
Attorney, Agent, or Firm—Sughrue, Rothwell, Mion, Zinn and Macpeak

[57] ABSTRACT

A glass for an eye glass lens having a composition comprising, in weight percent, 36 to 50% $SiO_2 + Al_2O_3 + B_2O_3$, but with 20 to 50% $SiO_2$, 0 to 13% $Al_2O_3$ and 0 to 20% $B_2O_3$; 5 to 35% $CaO + MgO$, but with 5 to 35% $CaO$ and 0 to 20% $MgO$; 1 to 20% $Li_2O + Na_2O + K_2O$, but with 0 to 15% $Li_2O$ and 0 to 15% $Na_2O + K_2O$; 16 to 34% $ZrO_2 + TiO_2 + Nb_2O_5$, but with 0 to 11% $ZrO_2$, 0 to 3% $TiO_2$ and 8 to 30% $Nb_2O_5$; 0 to 15% $BaO + SrO + ZnO$; and 0 to 15% $La_2O_3 + Ta_2O_5 + WO_3$; with the glass having further a refractive index nd $\geq 1.69$, an Abbe number $\nu d \geq 40$, and a specific gravity $\leq 3.2$.

2 Claims, 1 Drawing Figure

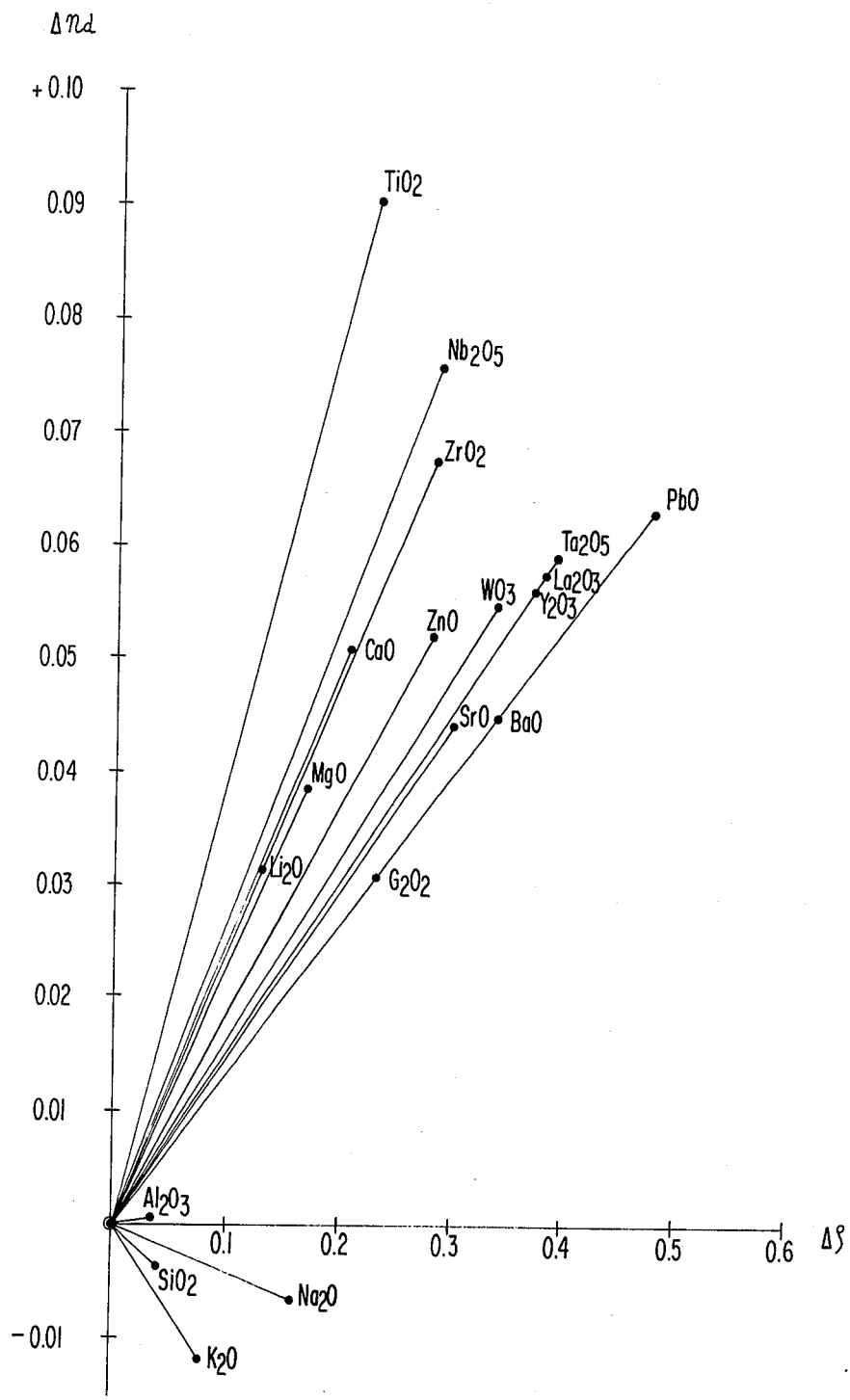

GLASS FOR EYE GLASS LENS

BACKGROUND OF THE DISCLOSURE

1. Field of the Invention

The present invention relates to a glass composition for an eye glass lens having a refractive index of 1.69 or higher, an Abbe number of 40 or higher, and a specific gravity of 3.2 or lower.

2. Description of the Prior Art

The correction of eye glass lens depends upon the refractive index and the curvatures of both surfaces of the lens but when the degree of myopia or hypermetropia advances, the thickness of the lens for correcting it increases at the outer edge portion and hence the appearance is spoiled and the lens becomes heavy resulting in an unpleasant feeling to the user. Therefore, a glass for an eye glass lens having a light weight and a high refractive index has been demanded and some glasses have been developed for these purposes as disclosed in, for example, U.S. Pat. No. 3,615,770. However, the glass disclosed therein has a small Abbe number of 30.1–31.5 and thus the lens has the disadvantage that the chromatic abberation of the outer edge portion thereof is large when the lens is used as an eye glass lens.

In particular, when the glass is used as an eye glass lens having a high diopter value, e.g., above ±10, the chromatic abberation becomes a serious problem.

SUMMARY OF THE INVENTION

An object of this invention is to provide a glass for an eye glass lens having a light weight, a high refractive index and a comparatively large Abbe number.

Another object of this invention is to provide a glass having desirable properties, which can be used as an eye glass lens unaccompanied by the above-described disadvantages.

The glass of this invention comprises, in weight percent, 36 to 50% $SiO_2$ + $Al_2O_3$ + $B_2O_3$, but with 20 to 50% $SiO_2$, 0 to 13% $Al_2O_3$ and 0 to 20% $B_2O_3$; 5 to 35% CaO + MgO, but with 5 to 35% CaO and 0 to 20% MgO; 1 to 20% $Li_2O$ + $Na_2O$ + $K_2O$, but with 0 to 15% $Li_2O$ and 0 to 15% $Na_2O$ + $K_2O$; and 16 to 34% $ZrO_2$ + $TiO_2$ + $Nb_2O_5$, but with 0 to 11% $ZrO_2$, 0 to 3% $TiO_2$ and 8 to 30% $Nb_2O_5$ as fundamental components and further 0 to 15% BaO + SrO + ZnO and 0 to 15% $La_2O_3$ + $Ta_2O_5$ + $WO_3$ as additional components.

BRIEF DESCRIPTION OF THE ACCOMPANYING DRAWING

Now, the FIGURE is a graph showing the change ($\Delta nd$) in refractive index $nd$ and the change ($\Delta p$) in specific gravity when $B_2O_3$ is replaced by other components each in the amount of 10% by weight in the comparison range of the glass of this invention.

DETAILED DESCRIPTION OF THE INVENTION

Turning now to the FIGURE, as is clear from the results shown in the graph, it is most advantageous to use $Li_2O$ as the monovalent component, CaO and MgO as the di-valent components, and $ZrO_2$, $TiO_2$ and $Nb_2O_5$ as the high valent components to obtain a glass having a high refractive index and a low specific gravity.

Thus, by using these fundamental components in limited ranges as the glass composition, discovery of a glass having a comparatively high Abbe number, a high chemical durability suitable for an eye glass lens, and a sufficient stability for mass production has now been made. Furthermore, the glass of this invention can be chemically tempered by ion exchange and the coloring defect is comparatively low.

Now, $SiO_2$, $Al_2O_3$ and $B_2O_3$ are the components comprising the main structure of the glass but if the total content of these components is higher than 50% by weight, the desired high refractive index is not obtained, while if the total content is less than 36% by weight, a glass having the desired low weight cannot be obtained. Furthermore, of these three components, if the content of $SiO_2$ is lower than 20% by weight and that of $B_2O_3$ is higher than 20% by weight, the glass has poor chemical durability and thus the glass is unsuitable for use as an eye glass lens, while if the content of $SiO_2$ is higher than 50% by weight, a glass having a desired refractive index is not obtained. Also, if the content of $Al_2O_3$ is higher than 13%, the glass shows a strong tendency toward crystallization.

CaO and MgO are the components necessary for increasing the stability of the glass toward devitrification but if the total of both components is higher than 35% by weight or lower than 5% by weight, the glass shows a strong tendency toward crystallization. Of the two components, MgO is not an essential component but by replacing a part of the CaO with MgO, the glass is effectively stabilized.

$Li_2O$, $Na_2O$ and $K_2O$ are the components necessary for suppressing the phase separation tendency of the glass and increasing the stability of the glass to devitrification.

The total of the three components must be higher than 1% by weight for these purposes, but if the total of these components is higher than 20%, the chemical durability of the glass becomes poor and thus the glass is unsuitable for use as an eye glass lens. Also, of these three components, $Li_2O$ is the most advantageous component for obtaining a glass having a low specific gravity and also is more effective for improving the chemical durability of the glass than $Na_2O$ and $K_2O$. However, if the content of $Li_2O$ is higher than 15% by weight, the glass shows a strong tendency toward crystallization. Moreover, $Na_2O$ and $K_2O$ are effective for improving the stability of the glass but if the total of both components is higher than 15% by weight, the chemical durability of the glass becomes poor and thus the glass is unsuitable for use as an eye glass lens and a glass having a desired light weight is not obtained.

If the total of the components of $ZrO_2$, $TiO_2$ and $Nb_2O_5$ is higher than 34% by weight, a glass having the desired Abbe number is not obtained and the glass becomes unstable. However, if the total of the components is lower than 16% by weight, a high refractive index for the glass cannot be maintained and the chemical durability of the glass becomes poor. Of these three components, if the content of $Nb_2O_5$ is higher than 30% by weight, a glass having the desired Abbe number is not obtained, while if the content of $Nb_2O_5$ is lower than 8% by weight, a glass having the desired high refractive index is not obtained and the chemical durability of the glass becomes poor.

$ZrO_2$ is the component giving rise to the stabilization of the glass and useful for increasing the Abbe number of the glass, but if the content of $ZrO_2$ is higher than 11% by weight, the crystallizing tendency of the glass increases rapidly.

$TiO_2$ is the component providing the highest refractive index and a low specific gravity but it, on the contrary, colors the glass and further decreases greatly the Abbe number of the glass. Accordingly, the content of $TiO_2$ must be maintained less than 3% by weight in order to obtain a glass having less coloring and a large Abbe number.

As additional components, BaO, SrO, ZnO and also $La_2O_3$, $Ta_2O_5$ and $WO_3$ can be used for improving further the stabilization of the glass and adjusting the Abbe number but if the content of each is higher than 15% by weight, a glass having the desired specific gravity is not obtained.

Still further, small amounts of $Y_2O_3$, $Gd_2O_3$ and $GeO_2$ can be added to the glass composition of this invention in a range which does not degrade the characteristics of the glass but the addition of these components is not so desirable since they are expensive components.

Examples of the glass compositions of this invention are shown in the following table together with the properties thereof, wherein the components are shown by weight percent.

These glasses of this invention may be prepared by melting a mixture of a silica powder, aluminum hyroxide, boric acid, calcium carbonate, magnesium carbonate, lithium carbonate, sodium carbonate, potassium nitrate, zirconium oxide, titanium oxide, niobium pentoxide, etc., at 1300°–1450° C. in a platinum crucible followed by stirring to form a uniform melt mixture and to perform defoaming, pouring the melt in a metallic mold preheated to an appropriate temperature to prevent breaking, e.g., 400°–500° C and then cooling the melt slowly to eliminate strain of the glass.

While the invention has been described in detail and with reference to specific embodiments thereof, it will be apparent to one skilled in the art that various changes and modifications can be made therein without departing from the spirit and scope thereof.

What is claimed is:

1. A glass for an eye glass lens comprising, in weight percent, 36 to 50% $SiO_2$ + $Al_2O_3$ + $B_2O_3$, but with 20 to 50% $SiO_2$, 0 to 13% $Al_2O_3$, and 0 to 20% $B_2O_3$; 5 to 35% CaO + MgO, but with 5 to 35% CaO and 0 to 20% MgO; 1 to 20% $Li_2O$ + $Na_2O$ + $K_2O$, but with 0 to 15% $Li_2O$ and 0 to 15% $Na_2O$ + $K_2O$; 16 to 34%

|                      | Example No. |      |      |      |      |      |      |      |      |      |
|----------------------|------|------|------|------|------|------|------|------|------|------|
| Component            | 1    | 2    | 3    | 4    | 5    | 6    | 7    | 8    | 9    | 10   |
| $SiO_2$              | 41.5 | 43.5 | 38.5 | 38.5 | 43.5 | 39.5 | 43.5 | 31.5 | 38.5 | 42.0 |
| $B_2O_3$             | —    | —    | —    | —    | —    | —    | —    | 10.0 | —    | —    |
| $Al_2O_3$            | —    | —    | —    | —    | —    | —    | —    | —    | 9.0  | —    |
| CaO                  | —    | 15.9 | 19.9 | 19.9 | 19.9 | 31.9 | 9.9  | 28.0 | 20.0 | 23.9 |
| MgO                  | 19.9 | —    | —    | —    | —    | —    | —    | —    | —    | —    |
| $Li_2O$              | 8.0  | 12.0 | 3.0  | 8.0  | 8.0  | 4.0  | 8.0  | 4.0  | 4.0  | 8.0  |
| $Na_2O$              | —    | —    | 10.0 | —    | —    | —    | —    | —    | —    | —    |
| $K_2O$               | —    | —    | —    | 5.0  | —    | —    | —    | —    | —    | —    |
| $Nb_2O_5$            | 25.6 | 23.6 | 23.6 | 23.6 | 17.6 | 19.6 | 23.6 | 15.5 | 19.5 | 17.1 |
| $ZrO_2$              | 5.0  | 5.0  | 5.0  | 5.0  | 5.0  | 5.0  | 5.0  | 5.0  | 3.0  | 9.0  |
| $TiO_2$              | —    | —    | —    | —    | —    | —    | —    | —    | 2.0  | —    |
| BaO                  | —    | —    | —    | —    | —    | —    | —    | 4.0  | —    | —    |
| SrO                  | —    | —    | —    | —    | —    | —    | 10.0 | —    | 4.0  | —    |
| ZnO                  | —    | —    | —    | —    | —    | —    | —    | 2.0  | —    | —    |
| $La_2O_3$            | —    | —    | —    | —    | 2.0  | —    | —    | —    | —    | —    |
| $Ta_2O_5$            | —    | —    | —    | —    | 2.0  | —    | —    | —    | —    | —    |
| $WO_3$               | —    | —    | —    | —    | 2.0  | —    | —    | —    | —    | —    |
| $\eta d$             | 1.698| 1.696| 1.691| 1.697| 1.690| 1.711| 1.700| 1.698| 1.694| 1.697|
| $\gamma d$           | 40.2 | 41.0 | 40.0 | 40.8 | 43.0 | 42.6 | 41.8 | 44.7 | 41.2 | 43.3 |
| Specific Gravity     | 3.08 | 3.01 | 3.14 | 3.08 | 3.13 | 3.17 | 3.17 | 3.17 | 3.11 | 3.08 |
| Acid Resistance (%)  | <0.1 | <0.1 | <0.1 | <0.1 | <0.1 | <0.1 | 0.1  | 0.3  | 0.1  | <0.1 |

In the table, the acid resistance is the weight reduction percentage of the glass when a sample powder of the glass was immersed in an aqueous 0.01 N nitric acid solution for one hour at 100° C. according to the "The Method of Measuring the chemical Durability of Optical Glass (Powder Method)" by the Standard of Nippon Kogaku Glass Kogyo Kai (The Society of the Nippon Optical Glass Industry).

$ZrO_2$ + $TiO_2$ + $Nb_2O_5$, but with 0 to 11% $ZrO_2$, 0 to 3% $TiO_2$, and 8 to 30% $Nb_2O_5$; 0 to 15% BaO + SrO + ZnO; and 0 to 15% $La_2O_3$ + $Ta_2O_5$ + $WO_3$.

2. The glass for an eye glass lens as claimed in claim 1 wherein said glass has a refractive index of 1.69 or higher, an Abbe number of 40 or higher, and a specific gravity of 3.2 or lower.

* * * * *